(12) United States Patent
Vijayasekaran et al.

(10) Patent No.: US 9,679,015 B2
(45) Date of Patent: Jun. 13, 2017

(54) SCRIPT CONVERTER

(71) Applicant: Bank of America Corporation, Charlotte, NC (US)

(72) Inventors: Vimal Vijayasekaran, Charlotte, NC (US); Dirk Anderson, Jacksonville, FL (US); Vijayakumar Gurusamy Raju, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 328 days.

(21) Appl. No.: 14/475,948

(22) Filed: Sep. 3, 2014

(65) Prior Publication Data

US 2016/0063019 A1 Mar. 3, 2016

(51) Int. Cl.
*G06F 17/30* (2006.01)

(52) U.S. Cl.
CPC .. *G06F 17/30483* (2013.01); *G06F 17/30451* (2013.01)

(58) Field of Classification Search
CPC . G06F 17/30483; G06F 17/30451; G06F 8/40
See application file for complete search history.

(56) References Cited

U.S. PATENT DOCUMENTS

| | | | | |
|---|---|---|---|---|
| 7,552,145 B1 * | 6/2009 | Errigo | | G06Q 10/00 |
| 7,721,303 B2 * | 5/2010 | Alves de Moura | | G06F 8/38 |
| | | | | 709/202 |
| 7,991,874 B2 * | 8/2011 | Gulledge | | G06Q 10/10 |
| | | | | 705/51 |
| 8,051,410 B2 * | 11/2011 | Marfatia | | G06F 8/51 |
| | | | | 717/124 |
| 8,407,237 B1 * | 3/2013 | Kudryavtsev | | G06F 17/30557 |
| | | | | 707/762 |
| 8,452,636 B1 * | 5/2013 | Verastigui | | G06Q 30/0201 |
| | | | | 705/7.29 |
| 9,043,218 B2 * | 5/2015 | Gilbert | | G06F 21/604 |
| | | | | 705/7.11 |
| 9,053,460 B2 * | 6/2015 | Gilbert | | G06F 21/554 |
| 2007/0239818 A1 * | 10/2007 | Liou | | G06F 17/30581 |
| | | | | 709/201 |
| 2010/0030604 A1 * | 2/2010 | Cummins | | G06Q 10/0633 |
| | | | | 705/7.27 |
| 2011/0153662 A1 * | 6/2011 | Stanfill | | G06F 17/30445 |
| | | | | 707/774 |
| 2012/0239680 A1 * | 9/2012 | Gudla | | G06Q 90/00 |
| | | | | 707/769 |

(Continued)

*Primary Examiner* — Huawen A Peng
(74) *Attorney, Agent, or Firm* — Michael A. Springs (57) ABSTRACT

According to an embodiment, an apparatus including a memory and a processor is provided. The memory may store a plurality of conversion rules. The processor may receive a first script and determine a first type associated with the first script, a plurality of variables included in the first script, and a first layout associated with the first script. The processor may determine that at least one conversion rule of the plurality of conversion rules should be applied. The processor may determine a second type, a second variable, and a second layout. The processor may generate a second script associated with the second type and the second layout, the second script comprising the second variable, the second script executable against a database comprising a plurality of database processors.

6 Claims, 3 Drawing Sheets

(56) References Cited

U.S. PATENT DOCUMENTS

| | | | | |
|---|---|---|---|---|
| 2012/0284719 A1* | 11/2012 | Phan | ..................... | G06F 9/4843 |
| | | | | 718/101 |
| 2013/0080874 A1* | 3/2013 | Coleman | ........... | G06F 17/30893 |
| | | | | 715/234 |
| 2015/0363478 A1* | 12/2015 | Haynes | ................ | G06Q 10/101 |
| | | | | 707/625 |

* cited by examiner

FIG. 3

SCRIPT CONVERTER

TECHNICAL FIELD

This disclosure relates generally to script conversion.

BACKGROUND

The number and size of databases has increased as the demand for data storage has increased. Database scripts may be used to manage and maintain these databases.

SUMMARY OF THE DISCLOSURE

In accordance with the present disclosure, disadvantages and problems associated with converting database scripts may be reduced or eliminated.

According to an embodiment, an apparatus including a memory and a processor is provided. The memory may store a plurality of conversion rules associated with converting scripts. The processor may receive a first script and determine a first type associated with the first script, a plurality of variables included in the first script, and a first layout associated with the first script. The processor may determine, based at least in part upon the type, that at least one conversion rule of the plurality of conversion rules should be applied. The processor may determine a second type based at least in part upon the at least one conversion rule and the first type, a second variable based at least in part upon the at least one conversion rule, the second type, and at least one variable of the plurality of variables, and a second layout based at least in part upon the at least one conversion rule, the second type, and the first layout. The processor may generate a second script associated with the second type and the second layout, the second script comprising the second variable, the second script executable against a database comprising a plurality of database processors. Each database processor of the plurality of database processors is operable to communicate directly with every other database processor of the plurality of database processors, and a capacity of the database corresponds to a number of database processors in the plurality of database processors. The database is operable to receive a query, divide the query into a plurality of sub-queries, and process each sub-query of the plurality of sub-queries. Each sub-query is processed by a different database processor of the plurality of database processors.

Technical advantages of certain embodiments of the present disclosure include a reduction in network traffic associated with executing database scripts. A technical advantage of certain embodiments includes reduced memory consumption associated with converting database scripts. Another technical advantage of certain embodiments includes increased processing speed resulting from reduced memory consumption. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
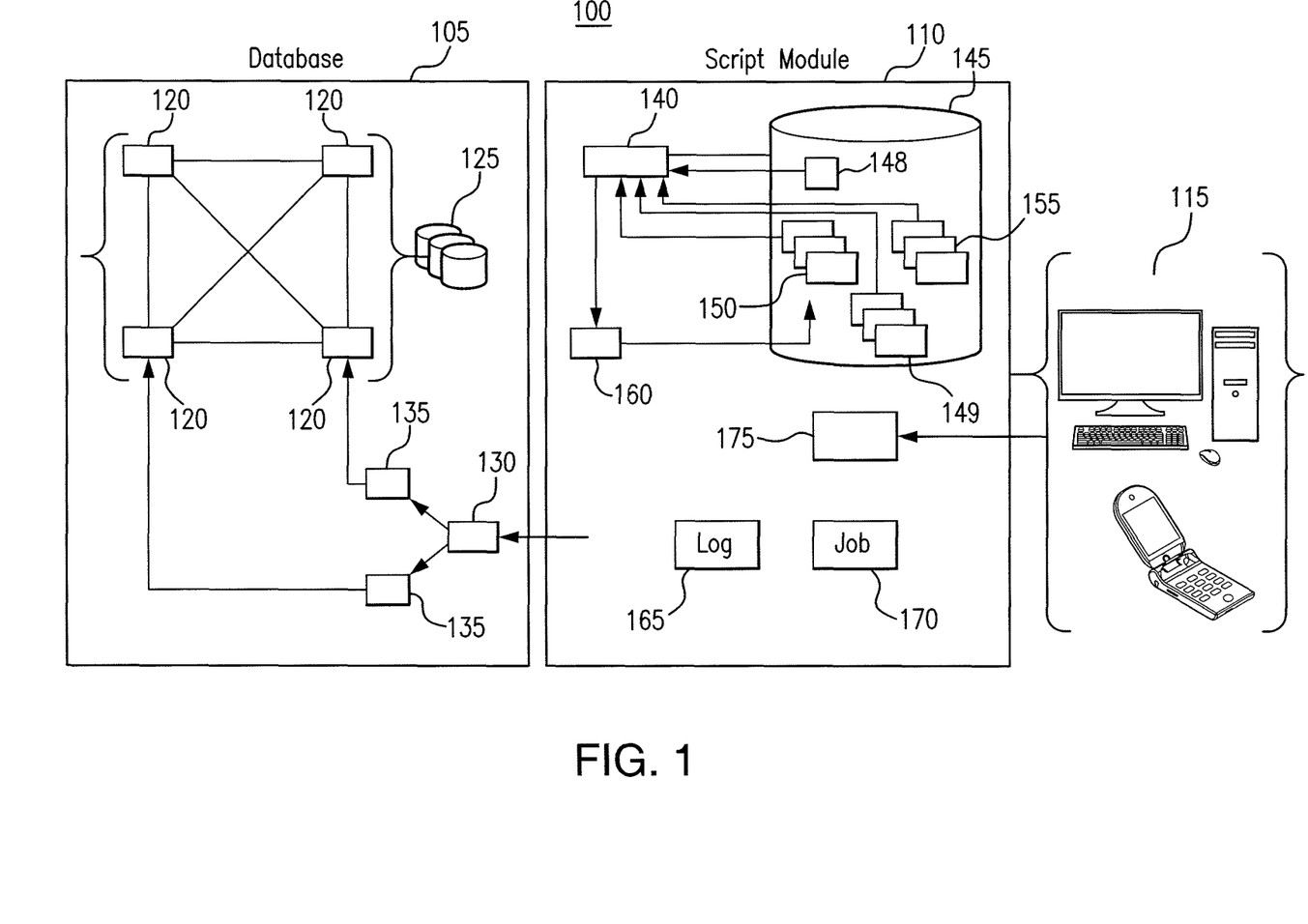
FIG. 1 is a schematic diagram of one embodiment of a system for converting scripts.
Figure 2:
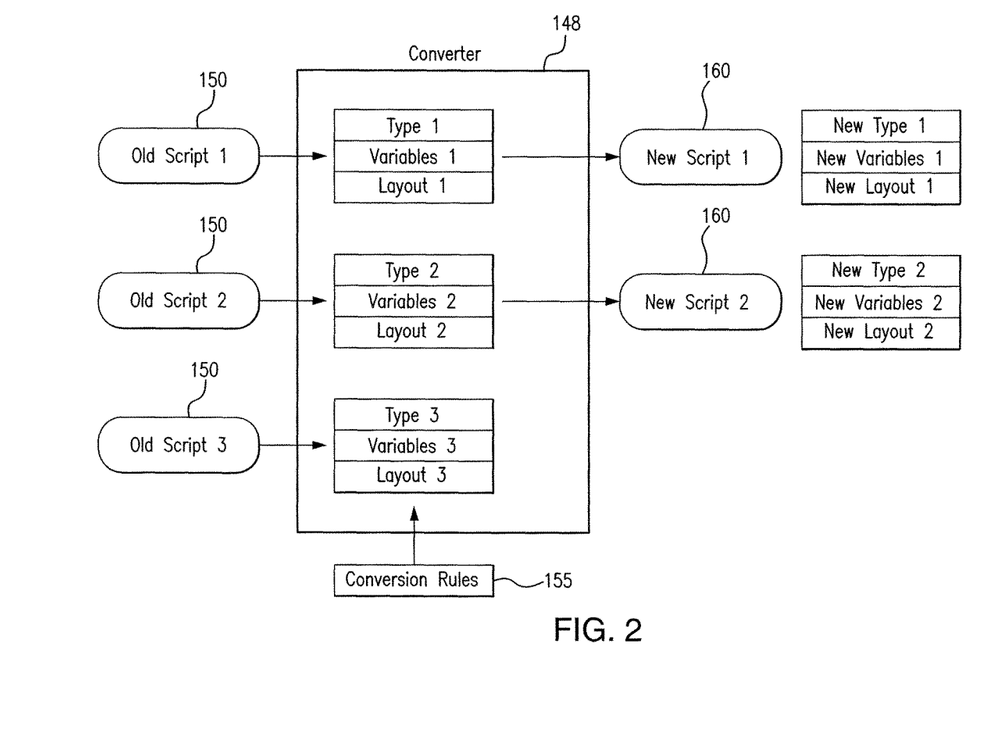
FIG. 2 is a diagram of one embodiment of a converter of the system of FIG. 1.
Figure 3:
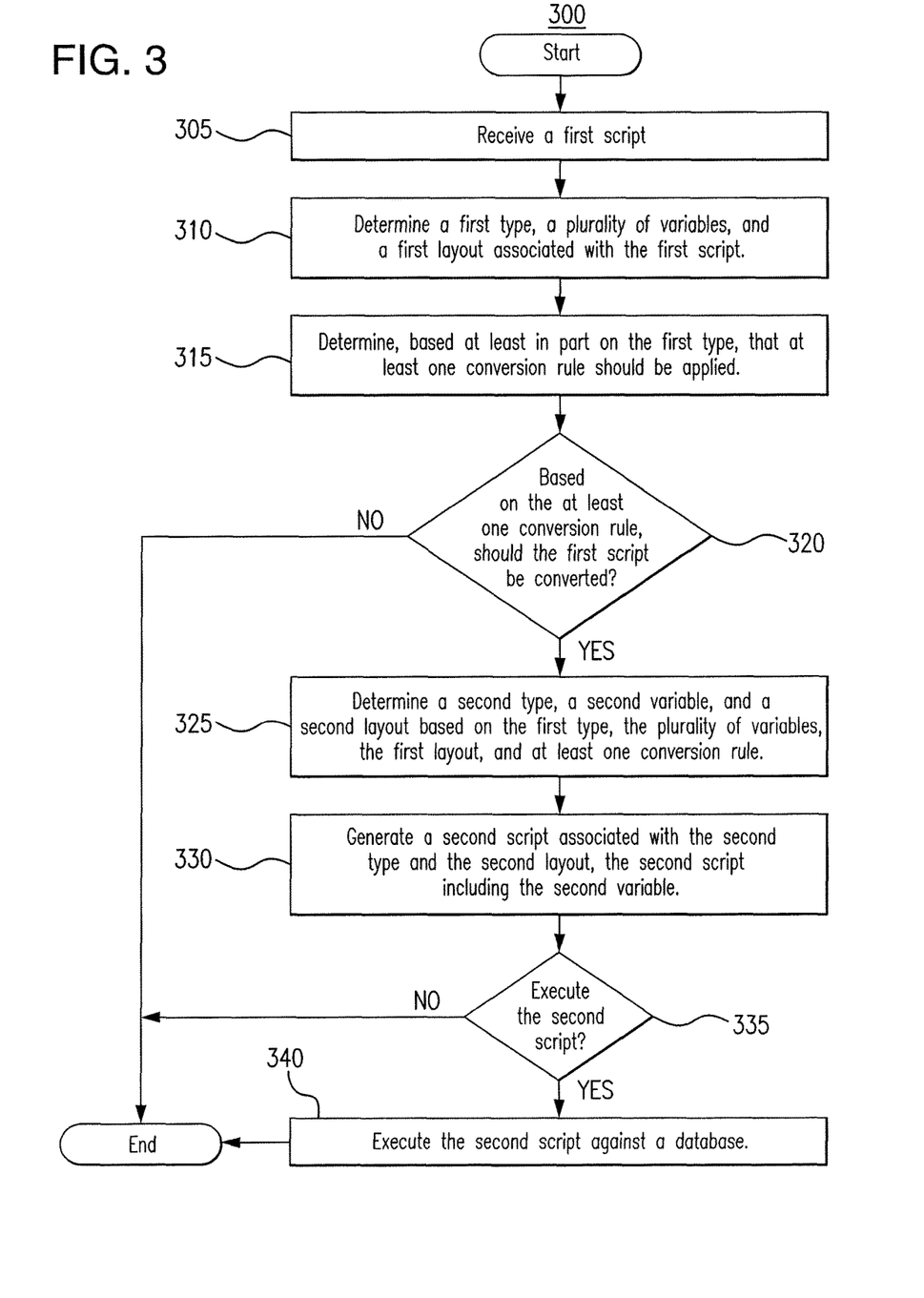
FIG. 3 is a flowchart illustrating a method of converting scripts using the system of FIG. 1.

Embodiments of the present invention and its advantages are best understood by referring to FIGS. 1 through 3, like numerals being used for like and corresponding parts of the various drawings.

As the demand for data storage has grown, the number and size of databases has increased. Database scripts may be used to manage and maintain these databases. However, as database technology changes and improves, certain database scripts may become obsolete and/or stop executing against those databases. In some instances, these scripts may be converted and/or updated so that they may execute against the databases. However, updating scripts may needlessly consume network and memory resources and may result in errors that cause the updated script to not function properly.

A script converter may improve the accuracy and speed of the script converting process. The script converter may receive and analyze old scripts. Then, based on stored conversion rules, the script converter may convert the old scripts to new scripts that will execute properly against a new or updated database. A system that uses the script converter is shown and described in FIGS. 1 through 3 and their corresponding descriptions.

FIG. 1 is a schematic diagram of one embodiment of a system 100 for converting scripts. As shown in FIG. 1, system 100 may include a database 105, a script module 110, and a device 115. Database 105, script module 110, and device 115 may be communicatively coupled to each other. System 100 may be used to convert database scripts and to execute database scripts against database 105.

Each component of system 100 may be communicatively coupled to each other. System 100 may include a network that facilitates communication between components of system 100. This disclosure contemplates any suitable network operable to facilitate communication between the components of system 100. The network may include any interconnecting system capable of transmitting audio, video, signals, data, messages, or any combination of the preceding. The network may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 105 may include one or more database processors 120 and one or more storage modules 125. This disclosure contemplates database 105 including any appropriate number of database processors 120 and any appropriate number of database storage modules 125. Database processors 120 and database storage modules 125 may perform any of the functions associated with database 105 described herein.

Each database processor 120 may be communicatively coupled to every other database processor 120 of database 105. In this manner, each database processor 120 may communicate with any other database processor 120 of database 105. Each database processor 120 may be communicatively coupled to database storage modules 125. In this manner, database processors 120 may retrieve and process data stored in database storage modules 125. In particular embodiments, each database processor 120 may be communicatively coupled to a different database storage module 125. Database processors 120 may control the operation and administration of database 105. Database processors 120 may include any hardware and/or software that operates to control and process information. Database processors 120 may be programmable logic devices, microcontrollers, microprocessors, any suitable processing devices, or any suitable combination of the preceding.

Database storage modules 125 may store retrievable data. Database storage modules 125 may send data to a database processor 120. Database storage modules 125 may store, either permanently or temporarily, data, operational software, or other information for database processor 120. Database storage modules 125 may include any one or a combination of volatile or non-volatile local or remote devices suitable for storing information. For example, database storage modules 125 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in database storage modules 125, a disk, a CD, or a flash drive. In particular embodiments, the software may include an application executable by database processor 120 to perform one or more of the functions described herein.

Database processor 105 may receive queries 130 that request data stored in database storage modules 125. Database 105 may receive queries 130 from script module 110. This disclosure contemplates database 105 receiving queries from any appropriate component such as, for example, device 115. In response to receiving query 130, database 105 may retrieve the requested data stored in database storage modules 125 and communicate the data to the appropriate component of system 100 such as, for example, script module 110 and/or device 115. For example, script module 110 may communicate a query 130 requesting the account information of ten user accounts. In response, database 105 may retrieve the account information from database storage modules 125 and communicate the account information to script module 110.

Database 105 may divide query 130 into one or more sub-queries 135. Each sub-query 135 may then be processed by a different database processor 120. In this manner, the efficiency of database 105 may be improved. Using the previous example, query 130 may request account information that is stored in two different tables in data storage modules 125. For example, query 130 may request usernames stored in one table and social security numbers stored in a separate table. Database 105 may divide query 130 into two sub-queries 135. The first sub-query 135 may request the usernames and the second sub-query 135 may request the social security numbers. Each sub-query 135 may then be processed by a different database processor 120. The first database processor 120 may request the usernames from database storage modules 125 and the second database processor 120 may request the social security numbers from database storage modules 125. After the usernames and social security numbers are retrieved, the database processors 120 may combine the retrieved data and communicate it to script module 110.

This disclosure contemplates database 105 dividing a query 130 in any appropriate manner. For example, database 105 may divide query 130 based on the size of the data to be retrieved. If query 130 requests a large quantity of data, database 105 may divide query 130 so that each sub-query 135 requests a subset of that data. Each sub-query 135 may then be processed by a different database processor 120. In this manner, each database processor 120 may process a subset of the requested data and each database processor 120 may process a smaller quantity of data than if query 130 had been processed by a single database processor 120.

In particular embodiments, each database processor 120 may be associated with a different database storage module 125. A query 130 may be divided into sub-queries 135 based on the particular database storage modules 125 to be accessed. In this manner each database processor 120 may process a sub-query 135 that requests data from only the database storage module 125 associated with the database processor 120. In these embodiments, the storage capacity of database 105 is directly proportional to the number of database processors 120 included in database 105. As a result, an increase in the capacity of database 105 may be accompanied by an increase in processing power.

Script module 110 may include a processor 140 and a memory 145. Processor 140 may be communicatively coupled to memory 145. This disclosure contemplates processor 140 and memory 145 performing any function of script module 110 described herein, such as, for example, storing, converting and/or executing scripts.

Memory 145 may store a converter 148, one or more formatting rules 149, one or more scripts 150, and one or more conversion rules 155. Memory 145 may store, either permanently or temporarily, data, operational software, or other information for processor 140. Memory 145 may include any one or a combination of volatile or non-volatile local or remote devices suitable for storing information. For example, memory 145 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 145, a disk, a CD, or a flash drive. In particular embodiments, the software may include an application executable by processor 140 to perform one or more of the functions described herein.

Processor 140 may execute converter 148 to convert scripts 150 based on conversion rules 155. Processor 140 may execute software stored on memory 145, such as converter 148, to perform any of the functions described herein. Processor 140 may control the operation and administration of script module 110. Processor 140 may include any hardware and/or software that operates to control and process information. Processor 140 may be a programmable logic device, a microcontroller, a microprocessor, any suitable processing device, or any suitable combination of the preceding.

Converter 148 may be an application comprising software instructions executable by processor 140. Processor 140 may execute converter 148 to convert scripts 150. In certain embodiments, processor 140 may execute converter 148 in response to receiving a command to execute converter 148.

Scripts 150 may include instructions to communicate certain queries 130 to database 105. Processor 140 may execute one or more scripts 150 to submit one or more queries to database 105. For example, when processor 140 executes script 150, processor 140 may communicate a query 130 to retrieve a set of data from database 105 and another query 130 to write another set of data to database 105. Scripts 150 may provide a way to communicate multiple, predefined queries 130 to be processed by database 105.

Script 150 may be associated with a type. The type may indicate the one or more queries 130 that are communicated to database 105 when script 150 is executed. For example, script 150 may have a type that indicates that script 150 inserts data into database 105 when executed. As another example, script 150 may have a type that indicates that script 150 changes and/or deletes data from database 105 when executed. This disclosure contemplates script 150 having any appropriate type. The type of script 150 may determine whether script 150 is converted. For example, if only scripts 150 that delete data from database 105 must be converted and/or updated, then scripts 150 with the type that indicate that scripts 150 insert data into database 105 may be ignored during the conversion process.

In certain embodiments, script 150 may have a layout. The layout may be determined based on the type associated with script 150. For example, a script 150 that inserts data into database 105 may have a different layout than a script 150 that deletes data from database 105. The layout may indicate one or more queries 130 to be communicated and an ordering of those queries 130 if script 150 were to be executed. When script 150 is converted, its layout may be preserved and/or changed.

In particular embodiments, scripts 150 may not be executable against database 105 after database 105 has been updated and/or improved. However, scripts 150 may be converted and/or updated so that they are executable against database 105. Processor 140 may convert scripts 150 based on conversion rules 155 to produce one or more converted scripts 160.

During the conversion process, processor 140 may first determine a type associated with a script 150. Processor 140 may then determine a conversion rule 155 that should be applied based on the type. For example, if script 150 has a type that indicates that script 150 inserts data into database 105, processor 140 may select a conversion rule 155 associated with scripts 150 that insert data into database 105. In addition to determining the type, processor 140 may determine a layout associated with script 150. Processor 140 may also determine one or more variables included in script 150. Variables may be defined by a user so it may be necessary to preserve the variables in the converted script 160.

To convert script 150, processor 140 may determine a new type based on the type of script 150 and conversion rule 155. Processor 140 may then assign the new type to converted script 160. As an example, conversion rule 155 may indicate that scripts 150 that delete data from database 105 should be converted to a new type. This conversion may be necessary because database 105 has been updated to process a different type of script. Processor 140 may convert the scripts 150 that delete data from database 105 to the new type.

Processor 140 may also determine a new layout for converted script 160. Processor 140 may determine the new layout based on the layout of script 150 and conversion rule 155. For example, conversion rule 155 may indicate that the layout of converted script 160 should be different from the layout of script of 150. Based on that conversion rule 155, processor 140 may determine the new layout for a converted script 160. As an example, conversion rule 155 may indicate that scripts 150 that delete data from database 105 should communicate a set of queries 130 in a particular order. Based on conversion rule 155, processor 140 may reorder the layout of script 150 to produce converted script 160.

Processor 140 may further determine, based on conversion rule 155, a set of variables from script 150 that should be preserved and/or changed. For example, conversion rule 155 may indicate that certain variables should be changed and certain variables should be preserved during the conversion process. Based on that conversion rule 155, processor 140 may preserve the variables in converted script 160 and change the appropriate variables for converted script 160.

After processor 140 generates converted script 160, processor 140 may store converted script 160 in memory 145. Converted script 160 may be associated with the new type and the new layout, and include the changed variables and the preserved variables. Processor 140 may execute converted script 160 against database 105.

In particular embodiments, script module 110 may generate a log 165 that contains information associated with script conversions. For example, log 165 may indicate a number of successful conversions and a number of failed conversions. When script module 110 is successful in generating a converted script 160, script module 110 may increment the number of successful conversions. Likewise, when script module 110 fails to generate a converted script 160, script module 110 may increment the number of failed conversions. This disclosure contemplates log 165 containing any appropriate information associated with script conversions. Log 165 may be stored in memory 145.

Script module 110 may execute one or more scripts 150 or one or more converted scripts 160 against database 105 in response to receiving a job 170. Job 170 may indicate a number of scripts 150 or converted scripts 160 to be executed against database 105. In response to receiving job 170, script module 110 may executed the indicated scripts 150 or converted scripts 160. In this manner, script module 110 may execute multiple scripts against database 105. Job 170 may be communicated to script module 110 by device 115. In particular embodiments, script module 110 may determine, based on one or more conversion rules 155, that job 170 should be converted and/or updated. For example, job 170 may indicate the types associated with the scripts 150 and/or converted scripts 160 to be executed. Script module 110 may determine, based on one or more conversion rules 155, that these indicated types should be converted and/or updated. In response to that determination, script module 110 may convert and/or update job 170 to indicate the converted and/or updated types. In particular embodiments, in converting job 170, script module 110 may generate a new job that is the converted job 170.

Device 115 may be communicatively coupled to script module 110. In particular embodiments, script module 110 may be embodied in device 115. This disclosure contemplates device 115 being any appropriate device for sending and receiving communications over a network. As an example and not by way of limitation, device 115 may be a computer, a laptop, a wireless or cellular telephone, an electronic notebook, a personal digital assistant, a tablet, or any other device capable of receiving, processing, storing, and/or communicating information with other components of system 100. Device 115 may also include a user interface, such as a display, a microphone, keypad, or other appropriate terminal equipment. In some embodiments, an application executed by device 115 may perform the functions described herein.

Device 115 may communicate an input 175 to script module 110. In certain embodiments, buttons and/or switches of device 115 may be pressed to generate input 175. Input 175 may indicate to script module 110 that certain scripts 150 or converted scripts 160 should be executed against database 105. Input 175 may also indicate to script module 110 that a certain job 170 should be executed. In certain embodiments, script module 110 may determine whether the format of input 175 is proper based on one or more formatting rules 149 before processing input 175. If script module 110 determines that input 175 is not in a proper format, script module 110 may refuse to process input 175. For example, if input 175 indicates that a script 150 should be executed against database 105, but input 175 contains incorrect syntax, script module 110 may not execute script 150 against database 105.

In particular embodiments, script module 110 may determine whether input 175 indicates a large number of scripts 150 to be converted and/or updated. Script module 110 may determine the number of scripts 150 to be converted as indicated by input 175. Script module 110 may then compare the number of scripts 150 to be converted against a threshold. The threshold may be stored in memory 145. If the number of scripts 150 to be converted exceeds the threshold, script module 110 may deny the conversions that exceed the threshold. In certain embodiments, script module 110 may allow a user to reduce the number of scripts 150 to be converted. In response to the determination that the number of scripts 150 indicated by input 175 exceeds the threshold, script module 110 may communicate a request to device 115 to request that the user select a set of scripts 150 from the scripts 150 indicated by input 175. The user may select the set of scripts 150 and device 115 may communicate the selection to script module 110. After receiving the selection, script module 110 may convert the selected scripts 150.

In operation, system 100 may convert scripts 150 to produce converted scripts 160 and system 100 may execute scripts 150 and/or converted scripts 160 against database 105. In particular embodiments, system 100 may reduce network traffic associated with executing database scripts by reducing the number of failed executions resulting from the execution of scripts 150 that should be converted before execution against database 105. In certain embodiments, system 100 may reduce memory consumption associated with converting database scripts by automating the conversion process. To explain the operation of system 100, an example of a user requesting social security numbers associated with ten thousand accounts will be used. This disclosure contemplates system 100 being used to request any amount of any appropriate type of data.

The user may use device 115 to generate the request for social security numbers. The user may use keyboard buttons and/or switches associated with device 115 to instruct device 115 to generate the request. For example, the user may type a command and device 115 may respond to the command. In certain embodiments, the user may wish to execute script 150 against database 105 to retrieve the social security numbers. The user may indicate to device 115 that the script 150 should be executed against database 105. In response, device 115 may communicate a request to script module 110 indicating that script 150 should be executed against database 105.

Script module 110 may examine script 150 and determine, based on a conversion rule 155, that script 150 should be converted and/or updated before it can be executed against database 105, because database 105 has been updated. In response to this determination, script module 110 may indicate to device 115 that script 150 should be updated.

The user may use device 115 to instruct script module 110 to update and/or convert script 150. The user may type and device 115 may generate input 175. Device 115 may then communicate input 175 to script module 110. Input 175 may instruct script module 110 to convert one or more scripts 150. Upon receiving input 175, script module 110 may examine input 175 to determine, based on one or more stored format rules 149, whether input 175 is in a proper format. For example, script module 110 may determine whether input 175 includes syntax errors and/or whether input 75 properly indicates the scripts 150 to be converted. If script module 110 determines that input 175 is not in a proper format, script module 110 may deny input 175.

Script module 110 may use converter 148 to convert scripts 150 in response to receiving input 175 that is in a proper format. Script module 110 may first retrieve the scripts 150 to be updated. Script module 110 may determine a type associated with each of the retrieved scripts 150. Script module 110 may then determine, based on these types and one or more conversion rules 155, whether the retrieved scripts 150 should be updated and/or converted. If the one or more conversion rules 155 indicate that scripts 150 of a particular type should not be updated, script module 110 may not convert and/or update those scripts 150.

Script module 110 may convert and/or update scripts 150 that the one or more conversion rules 155 indicate should be converted. For each script 150, script module 110 may determine a layout associated with the script 150 and a set of variables included in the script 150. Script module 110 may then determine, based on one or more conversion rules 155, a new type and a new layout associated with the script 150. Script module 110 may also determine, based on one or more conversion rules 155, that a variable in the set of variables should be converted to a new variable. After making these determinations, script module 110 may generate converted script 160. Converted script 160 may be associated with the new type and the new layout and may include the new variable. Script module 110 may then store converted script 160 in memory 145.

After the conversion is complete, script module 110 may indicate to device 115 that the conversion is complete. In response, the user may request that converted script 160 be executed against database 105. In particular embodiments, device 115 may communicate job 170 to script module 110 to indicate that converted script 160 should be executed. This disclosure contemplates job 170 indicating that any number of scripts 150 and/or converted scripts 160 should be executed against database 105.

After the conversion is complete, script module 110 may indicate the successful conversion in log 165. If the conversion failed, script module 110 may indicate the failure in log 165.

Converted script 160 may indicate that one more queries 130 should be communicated to database 105. When script module 110 executes converted script 160, the one or more queries 130 may be communicated to database 105. Database 105 may return data in response to receiving the one or more queries 130. Using the previously described example, converted script 160 may indicate that a query 130 should be communicated to database 105 to retrieve the social security numbers associated with the ten thousand accounts. In response to communicating the query 130, script module 110 may receive ten thousand social security numbers from database 105.

Database 105 may receive query 130 and determine that it should be divided into sub-queries 135. For example, database 105 may determine that the ten thousand social security numbers are stored amongst multiple database storage modules 125. In response to that determination, database 105 may divide query 130 into multiple sub-queries 135. Each sub-query 135 may request the social security numbers stored in one database storage module 125. Each sub-query 135 may then be processed by a different database processor 120. In this manner, each of these database processors 120 may retrieve social security numbers from only one database storage module 125.

After the social security numbers are retrieved, database 105 may combine the retrieved social security numbers and communicate them to script module 110. Script module 110 may then process and/or communicate the social security numbers to device 115. Device 115 may then present the information to the user.

FIG. 2 is a diagram of one embodiment of a converter 148 of the system 100 of FIG. 1. Script module 110 may use converter 148 to convert and/or update a script 150 to produce a converted script 160. In particular embodiments, converter 148 may convert and/or update script 150 based on one or more conversion rules 155. Converter 148 may reduce memory consumption associated with converting scripts 150 by automating the conversion process in certain embodiments.

Converter 148 may receive one or more scripts 150. In the illustrated example of FIG. 2, converter 148 may receive old script 1, old script 2, and old script 3. Converter 148 may examine each of these scripts 150 to determine whether it should be converted and/or updated.

Converter 148 may determine whether a script 150 should be updated based on one or more conversion rules 155 and a type associated with the script 150. In the illustrated example of FIG. 2, converter 148 has determined a type associated with each of old script 1, old script 2, and old script 3. Old script 1 is associated with type 1, old script 2 is associated with type 2, and old script 3 is associated with type 3. Converter 148 may use one or more conversion rules 155 and each of these types to determine whether old script 1, old script 2, and/or old script 3 should be converted and/or updated. For example, the one or more conversion rules 155 may indicate that scripts 150 of type 1 and type 2 should be converted and/or updated but scripts 150 of type 3 should not be converted and/or updated. Based on the one or more conversion rules 155, converter 148 may determine that old script 1 and old script 2 should be converted and/or updated but that old script 3 should not be converted and/or updated. Converter 148 may determine a layout associated with a script 150. The layout may indicate the structure of script 105, the queries 130 associated with script 150, and the ordering of the queries 130. In the illustrated example of FIG. 2, old script 1 is associated with layout 1, old script 2 is associated with layout 2, and old script 3 is associated with layout 3.

Converter 148 may further determine a set of variables included in each script 150. Variables may be defined by a user and may be used during the execution of the script 150. In the illustrated example of FIG. 2, old script 1 includes variables 1, old script 2 includes variables 2, and old script 3 includes variables 3. In particular embodiments, converter 148 may not determine a layout or set of variables for a script 150 that should not be converted and/or updated.

Converter 148 may convert a script 150 to produce a converted script 160 based on one or more conversion rules 155. Converting and/or updating a script 150 may include converting and/or updating a type, a layout and a variable associated with the script 150. In the illustrated example of FIG. 2, converter 148 may generate new script 1 and new script 2 based on old script 1 and old script 2. To produce new script 1, converter 148 may convert type 1 to new type 1, layout 1 to new layout 1 and variables 1 to new variables 1. These conversions may be performed based on one or more conversion rules 155. For example, one or more conversion rules 155 may indicate that type 1 should be converted to new type 1 and layout 1 should be converted to new layout 1. One or more conversion rules 155 may further indicate that variables 1 should be converted to new variables 1. Converter 158 may follow one or more conversion rules 155 to convert type 1, layout 1 and variables 1. A similar process may be performed to produce new script 2.

FIG. 3 is a flowchart illustrating a method 300 of converting scripts 150 using the system 100 of FIG. 1. Script module 110 may perform method 300. In particular embodiments, converter 148 may perform method 300.

Script module 110 may receive a first script in step 305. The first script may need to be converted and/or updated. In step 310, script module 110 may determine a first type, a plurality of variables, and a first layout associated with the first script. In step 315, script module 110 may determine, based at least in part on the first type, that at least one conversion rule should be applied. For example, script module 110 may determine that there is a conversion rule associated with the first type. Script module 110 may then determine that that conversion rule should be applied.

Script module 10 may continue to step 320 to determine, based on the at least one conversion rule, whether the first script should be converted. If the first script should not be converted, script module 110 may conclude. If the first script should be converted, script module 110 may proceed to step 325. As an example, the at least one conversion rule may indicate that scripts of the first type should be converted. Based on that conversion rule, script module 110 may determine that the first script should be converted because it is of the first type.

In step 325, script module 110 may determine a second type, a second variable and a second layout based on the first type, the plurality of variables, the first layout, and at least one conversion rule. For example, the at least one conversion rule may indicate that the first type should be converted to the second type, the first layout should be converted to the second layout, and a variable in the plurality of variables should be converted to the second variable. Based on at least one conversion rule, script module 110 may determine the second type, the second variable and the second layout.

In step 330, script module 110 may generate a second script associated with the second type and the second layout. Script module 110 may further include the second variable in the second script. In particular embodiments, the second script is the converted and/or updated first script.

Script module 110 may then continue to step 335 to determine whether the second script should be executed. In particular embodiments, a user may instruct script module 110 to execute the second script. If script module 110 determines that the second script should not be executed, script module 110 may conclude. If script module 110 determines that the second script should be executed, script module 110 may continue to step 340 to execute the second script against the database. In particular embodiments, the database may return data in response to the execution of the second script.

Although the present disclosure includes several embodiments, changes, substitutions, variations, alterations, transformations, and modifications may be suggested to one skilled in the art, and it is intended that the present disclosure encompass such changes, substitutions, variations, alterations, transformations, and modifications as fall within the spirit and scope of the appended claims.

What is claimed is:

1. An apparatus, comprising:
a memory operable to store a plurality of conversion rules for converting scripts; and
a processor communicatively coupled to the memory and operable to:
receive a first script executable against a database and an input;
determine, based at least in part upon at least one format rule, that the input is in a correct format;
determine that the input indicates a plurality of scripts;
determine that the number of scripts in the plurality of scripts exceeds a threshold;
in response to the determination that the number of scripts exceeds the threshold, communicate a request for a selection of scripts from the plurality of scripts;
receive, in response to the request, the selection of scripts;
determine a first type of the first script, wherein the first type indicates one or more queries communicated to the database when the first script is executed;
determine a plurality of variables included in the first script;
determine a first layout of the first script;
determine, based at least in part upon the first type, that at least one conversion rule of the plurality of conversion rules should be applied to convert the first script;
determine a second type based at least in part upon the at least one conversion rule and the first type;
determine, based at least in part upon the at least conversion rule, that a first variable of the plurality of variables should be preserved;
determine, based at least in part upon the at least conversion rule, that a second variable of the plurality of variables should be changed to a third variable;
determine a second layout based at least in part upon the at least one conversion rule, the second type, and the first layout;
generate a second script of the second type and having the second layout, the second script comprising the first variable and the third variable, the second script executable against the database, the database comprising a plurality of database processors;
receive a third script;
determine a third type of the third script;
determine, based at least in part upon the third type, that the third script should not be converted;
receive a first job for the execution of the first script;
determine that the first job should be converted; and
generate a second job in response to the determination that the first job should be converted;
generate a log comprising a number of successful conversions and a number of failed conversions, wherein:
each database processor of the plurality of database processors is operable to communicate directly with every other database processor of the plurality of database processors;
a storage capacity of the database is directly proportional to the number of database processors in the plurality of database processors; and
the database is operable to:
receive a query;
divide the query into a plurality of sub-queries; and
process each sub-query of the plurality of sub-queries, wherein each sub-query is processed by a different database processor of the plurality of database processors.

2. The apparatus of claim 1, wherein the processor is further operable to communicate the second script for execution against the database.

3. An method, comprising:
storing, by a memory, a plurality of conversion rules for converting scripts; and
receiving a first script executable against a database and an input;
determining, based at least in part upon at least one format rule, that the input is in a correct format;
determining that the input indicates a plurality of scripts;
determining that the number of scripts in the plurality of scripts exceeds a threshold;
in response to the determination that the number of scripts exceeds the threshold, communicating a request for a selection of scripts from the plurality of scripts;
receiving, in response to the request, the selection of scripts;
determining, by a processor, a first type of the first script, wherein the first type indicates one or more queries communicated to the database when the first script is executed;
determining, by the processor, a plurality of variables included in the first script;
determining, by the processor, a first layout of the first script;
determining, by the processor, based at least in part upon the first type, that at least one conversion rule of the plurality of conversion rules should be applied to convert the first script;
determining, by the processor, a second type based at least in part upon the at least one conversion rule and the first type;
determining, based at least in part upon the at least conversion rule, that a first variable of the plurality of variables should be preserved;
determining, based at least in part upon the at least conversion rule, that a second variable of the plurality of variables should be changed to a third variable;
determining, by the processor, a second layout based at least in part upon the at least one conversion rule, the second type, and the first layout;
generating a second script of the second type and having the second layout, the second script comprising the first variable and the third variable, the second script executable against the database, the database comprising a plurality of database processors;
receiving a third script;
determining a third type of the third script;
determining, in part upon the third type that, the third script should not be converted;
receiving a first job for the execution of the first script;
determining that the first job should be converted; and
generating a second job in response to the determination that the first job should be converted;
generating a log comprising a number of successful conversions and a number of failed conversions, wherein:

each database processor of the plurality of database processors is operable to communicate directly with every other database processor of the plurality of database processors;

a storage capacity of the database is directly proportional to the number of database processors in the plurality of database processors; and the database is operable to:
- receive a query;
- divide the query into a plurality of sub-queries; and
- process each sub-query of the plurality of sub-queries, wherein each sub-query is processed by a different database processor of the plurality of database processors.

4. The method of claim 3, further comprising communicating the second script for execution against the database.

5. One or more computer-readable non-transitory storage media embodying software that is operable when executed to:

store, by a memory, a plurality of conversion rules for converting scripts; and receive a first script executable against a database and an input;

determine, based at least in part upon at least one format rule, that the input is in a correct format;

determine that the input indicates a plurality of scripts;

determine that the number of scripts in the plurality of scripts exceeds a threshold;

in response to the determination that the number of scripts exceeds the threshold, communicate a request for a selection of scripts from the plurality of scripts;

receive, in response to the request, the selection of scripts;

determine, by a processor, a first type of the first script, wherein the first type indicates one or more queries communicated to the database when the first script is executed;

determine, by the processor, a plurality of variables included in the first script;

determine, by the processor, a first layout of the first script;

determine, by the processor, based at least in part upon the first type, that at least one conversion rule of the plurality of conversion rules should be applied to convert the first script;

determine, by the processor, a second type based at least in part upon the at least one conversion rule and the first type;

determine, based at least in part upon the at least conversion rule, that a first variable of the plurality of variables should be preserved;

determine, based at least in part upon the at least conversion rule, that a second variable of the plurality of variables should be changed to a third variable;

determine, by the processor, a second layout based at least in part upon the at least one conversion rule, the second type, and the first layout;

generate a second script of with the second type and having the second layout, the second script comprising the first variable and the third variable, the second script executable against the database, the database comprising a plurality of database processors;

receive a third script;

determine a third type of the third script;

determine, based at least in part upon the third type, that the third script should not be converted;

receive a first job for the execution of the first script;

determine that the first job should be converted; and generate a second job in response to the determination that the first job should be converted;

generate a log comprising a number of successful conversions and a number of failed conversions, wherein:

each database processor of the plurality of database processors is operable to communicate directly with every other database processor of the plurality of database processors;

a storage capacity of the database is directly proportional to the number of database processors in the plurality of database processors; and the database is operable to:
- receive a query;
- divide the query into a plurality of sub-queries; and
- process each sub-query of the plurality of sub-queries, wherein each sub-query is processed by a different database processor of the plurality of database processors.

6. The media of claim 5, embodying software that is further operable when executed to communicate the second script for execution against the database.

* * * * *